UNITED STATES PATENT OFFICE 2,436,204

COPOLYMERS COMPRISING ACRYLONITRILE AND VINYL ETHERS AND MOLECULARLY ORIENTED ARTICLES COMPOSED THEREOF

Gaetano F. D'Alelio, Northampton, Mass., assignor to Pro-phy-lac-tic Brush Company, Northampton, Mass., a corporation of Delaware No Drawing. Application February 25, 1944, Serial No. 523,902

14 Claims. (Cl. 18—54)

This invention relates to novel synthetic compositions wherein the molecules have been oriented so that they are parallel with the major surface. More particularly, this invention relates to formed structures which exhibit characteristic X-ray diffraction patterns and comprise a molecularly oriented copolymer of acrylonitrile and a vinyl ether of the formula

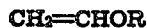

where R is a hydrocarbon radical selected from the class of alkyl, cycloalkyl and aralkyl. Illustrative examples of the radicals represented by R in the above formula are methyl, ethyl, propyl, butyl, isobutyl, secondary butyl, amyl, cyclopentyl, cyclohexyl, methyl cyclohexyl, ethyl cyclohexyl, ethyl cyclopentyl, phenyl, benzyl, phenethyl, etc. In general R is a radical selected from the class of alkyl radicals, aralkyl radicals, aryl radical and alkaryl radicals.

Acrylonitrile itself, when polymerized, possesses characteristic properties in that it has a very high softening point and is extremely resistant to the solvent action of many chemical bodies. Likewise, polyacrylonitrile is far too hard and brittle and has too high a softening point to be used in the preparation of extruded or precipitated bodies wherein the molecules have been oriented so that they are parallel with the major surface.

It has been known for some time that when acrylonitrile is copolymerized with certain suitable monomers, the properties of the copolymer are considerably altered even by small quantities of other monomers, and that from these copolymers, it is possible to produce workable masses. However, it is now recognized that many of these copolymers possess a new element and property in that they are capable of being converted, as for example, by cold drawing, into products and structures wherein the molecules have been oriented so that they are parallel with the major surface and whereby the formed structures exhibit characteristic X-ray diffraction patterns.

In my copending applications, Serial No. 445,808, filed June 4, 1942, now Patent No. 2,412,034; Serial No. 449,678, filed July 3, 1943, now Patent No. 2,366,495; and Serial No. 523,901, filed February 25, 1944, now Patent No. 2,425,086, certain copolymers of acrylonitrile were disclosed as capable of being cold drawn into objects that possessed a molecularly oriented structure along the major axis and which exhibited characteristic X-ray diffraction patterns. This was so in spite of the fact that neither acrylonitrile nor the copolymerizable ingredients individually could be cold drawn.

Likewise, it has been shown that polymers of acrylonitrile, when prepared by the ordinary methods, could not be cold drawn to give oriented products when copolymerized with such unsaturated compounds as butadiene, styrene, diethyl maleate and vinyl acetate. This behavior is not surprising since even at the present state of the art, it is impossible to predict what compounds will yield satisfactory cold-drawn fiber or film-forming compositions. This is true even of polymeric vinylidene chloride as emphasized in the United States Patent No. 2,233,442 which states that only selected copolymers will yield satisfactory products; e. g., most of the materials copolymerized with the vinylidene chloride do not in themselves exhibit characteristic X-ray diffraction patterns, and many of the copolymers of vinylidene chloride containing large proportions of these materials are similarly incapable of being drawn into strong pliable articles.

Generally speaking, it may be stated that thermoplastic polymers and copolymers of all types possess little or no tendency to form the crystalline patterns exhibited by the compositions of the present invention. For instance, the vinyl ethers used herein as the copolymerizing component are not in themselves capable of being cold drawn into fibers, films, tubes, etc. possessing oriented structures, nor can they be cold drawn in the desired manner when they are copolymerized with such polymerizable material as styrene, vinyl acetate, ethyl acrylate, methyl methacrylate, diethyl itaconate, isopropenyl toluene, etc. Even acrylonitrile itself cannot be so drawn when copolymerized with such unsaturated compounds as vinyl acetate, diethyl maleate, etc.

Even all copolymers of acrylonitrile and vinyl ethers cannot be cold drawn. For example, copolymers of isobutyl or vinyl butyl ether containing from 25 to 50% acrylonitrile cannot be cold drawn to give oriented products of this invention.

I have now discovered that if acrylonitrile is copolymerized with vinyl ethers of this invention in proportions of from approximately 55 to 85% of acrylonitrile and from 15 to 45% of vinyl ether, a copolymer is obtained which may be formed into the shape of filaments, foils, tubes, etc., which may be cold drawn to produce a molecularly oriented structure which exhibits the characteristic crystalline X-ray diffraction pattern.

Threads and filaments made from such compositions have outstanding tensile strengths of the order of 20,000 to 50,000 pounds per square inch. The threads are very flexible and can be tied into knots without breaking.

Copolymers of acrylonitrile and the vinyl ethers having substantially greater than 85% acrylonitrile are too hard and brittle and have too high melting points and are too insoluble to be readily adapted to the methods of forming molecularly oriented structures.

The preferred method of forming the oriented articles of this invention involves first, the copolymerization of the selected monomers. Two satisfactory methods of polymerization may be used, the mixture of monomers may be heated alone in the presence of an activating catalyst at a temperature below the boiling point of the mass. As the polymerization proceeds, the temperature may be increased as the vapor pressure of the mass decreases. The copolymer may be freed from any monomer or low molecular weight substances by any of several methods, as, for example, by extracting the polymer with methyl alcohol or steam distilling the polymer.

Alternately, emulsion or granulation polymerization methods may be employed. The granulation method is preferred. This method involves introducing the mixture of monomers, for example, the acrylonitrile and the vinyl ether, into aqueous solutions containing granulating agents.

Granulating agents are protective colloids which have relatively poor dispersing properties whereby they form nuclei for the formation of the granules of the heteropolymer. Such agents are usually called granulating agents and this process may be defined as the method of preparing these copolymers in granular form which comprises dispersing the polymerizable mixture under agitation.

Examples of such protective colloids and granulating agents are soluble starch, methyl starch, polyvinyl alcohol, partially hydrolyzed polyvinyl acetate, gelatine, sodium alginate, soluble salts of cellulose, glycolate soluble salts of starch, glycol soluble salts of polyvinyl alcohol glycolate, polymethacrylic acid, natural gums, etc.

As catalyst for the polymerization I may use any effective oxygen liberating agent such as benzoyl peroxide, sodium persulfate, potassium persulfate, sodium perborate, potassium perborate, hydrogen peroxide, stearyl peroxide, hyperperoxides, etc. Any suitable amount of catalyst may be used depending upon the nature of the catalyst. In general, between 0.1 and 2.0% of catalyst are used depending on the nature of the catalyst and upon the desired rate of polymerization. Part of the catalyst may be introduced at the initiation of the reaction and the remainder during the course of polymerization.

The ratio of the dispersed phase, that is, the mixture of the polymerizable monomers, to the dispersing phase, the water used with the emulsifying agent or protective colloid, may be varied widely. Satisfactory results are obtained in the range of 100 parts of monomer mixture to 100 to 500 parts of the dispersing phase.

Auxiliary organic solvents may likewise be used in the presence of dispersed and dispersing phases, such as dioxane, ethyl alcohol, ethyl acetate, etc. These ingredients may be added directly to the polymerizable mixture or may be present as diluents in the reacting ingredients. In the ordinary method of producing the granular polymers, precipitants are not usually required, but should a small amount of emulsion be obtained with the granular product, the resin contained in the emulsion may be precipitated, e. g., by acid precipitating agents, ethyl alcohol, freezing, etc.

In the polymerization process the reaction may be carried out conveniently at room temperatures or temperatures between 50 and 60° C., the time varying from about eight hours to a few days depending upon the composition of the ingredients, the amounts of catalyst, and the temperatures used. It is possible with very high catalyst concentrations, or with increased temperatures, to decrease the reaction time.

Likewise, acrylonitrile is preferred to methacrylonitrile because of greater ease of polymerizability, higher softening points, and the greater solvent resistance of the polymers derived from it. Methacrylonitrile may be used in conjunction with acrylonitrile to increase the susceptibility of the copolymer to solvents. Part of the acrylonitrile, of the order of about 5 to 25%, may be replaced by methacrylonitrile.

The copolymers of this invention are not readily adaptable to the ordinary extrusion methods used in the manufacture of thermoplastic resins, such as, for example, the preparation of cellulose acetate fibers.

The copolymers of this invention containing between 70 and 85% acrylonitrile possess a very high melting point in excess of 180° C., though at lower temperatures, say about 150° C., they are rather rubbery but still are not cohesive enough to be extruded to uniform fibers, films, and sheets, free of bubbles, etc.

Furthermore, the pressures required to extrude fine filaments are excessively high. Thus, copolymers containing more than 55 and less than 70% acrylonitrile have lower softening points and are adapted to extrusion methods. However, when even these copolymers are extruded in this manner, the high temperatures required may cause some reduction in their tensile strength.

Another object of this invention is to provide a method of preparing the fibers, filaments, etc. by shaping a gel of the copolymers of this invention, such as by extruding through suitable orifices, etc. This is accomplished by the use of solvents. The high insolubility of the acrylonitrile copolymers excludes the use of many solvents. I have found, however, that the nitrohydrocarbon derivatives are satisfactory in preparing the formed cold-drawn objects of this invention.

Thus, in preparing films of the copolymers of this invention, I dissolve the copolymer in a nitrohydrocarbon, for example, nitromethane, nitroethane, to produce a solution containing between 8 and 12% of the polymer in the nitrohydrocarbon, cast the films and remove the solvent by evaporation. After the sheet is formed, it is cold drawn during which process molecular orientation takes place along the major surface. The sheet in itself, as prepared, is not molecularly oriented. It is only after the cold drawing process that it exhibits characteristic X-ray diffraction patterns indicative of crystalline orientation. The increase in tensile strength and flexibility after the cold drawing is remarkable. On the other hand, fibers that are spun from the same hydrocarbon solutions are not completely satisfactory. Because of their insolubility, and because of the use of large amounts of solvent which must be removed, they must be subjected to a long period of heat to remove substantially all of the solvent.

I have now discovered that it is possible to produce more satisfactory sheets, fibers, filaments, and the like from the copolymers of this invention by shaping a gelled mass of the copolymer, as by extrusion. For example, a copolymer of 70 parts of acrylonitrile and 30 parts of vinyl butyl ether is soluble in nitromethane to the extent of 12%. If this solution is concentrated such as by heat under atmospheric or reduced pressure, the mixture loses the characteristics of a solution and acquires the properties of a gel; that is, the nitrohydrocarbon reverses phase and becomes dissolved in the copolymer, rather than the copolymer dissolved in the nitrohydrocarbon. The gel nature of this particular copolymer becomes evident at room temperature at about 15% acrylonitrile copolymer and 85% nitromethane. As this gel is heated, the viscosity decreases considerably so that it exhibits a cohesive flow at temperatures of the order of 55 to 90° C.

However, it is not necessary to prepare these gels by first dissolving the polymer in the hydrocarbon and concentrating the solution. I may prepare these gels by adding the desired amount of nitrohydrocarbon to the copolymer and forming the gel in suitable processing equipment, such as in a steam-heated dough mixer, Banbury mixer, rubber or plastic milling rolls, etc. Once prepared, the gel is degassed at a temperature above room temperature and sufficient to liquefy the gel. The degassed gel is then extruded into fibers and sheets at an orifice temperature so that the liquid nature of the gel is maintained. The extruded form resets as a gel after leaving the orifice and is dried at a low temperature to remove a quantity of the gelation solvent so that the gel does not reliquefy even when heated to progressively higher temperatures.

The following examples illustrate how my invention is carried into effect:

*Example 1*

Each of the following ratios of acrylonitrile and vinyl butyl ethers in which was dissolved 0.25% benzoyl peroxide was placed in glass containers and was polymerized under the influence of sunlight for several hours and then placed in a 50° C. oven to complete the polymerization.

|   | Acrylonitrile | Butyl Ethers |
|---|---|---|
|   | Parts | Isobutyl ether: |
| a | 60 | 40 parts |
| b | 63 | 37 parts |
| c | 66 | 34 parts |
| d | 68 | 32 parts |
| e | 70 | 30 parts |
| f | 72 | 28 parts |
| g | 75 | 25 parts |
| h | 78 | 22 parts |
|   |   | n-butyl ether: |
| j | 60 | 40 parts |
| i | 63 | 37 parts |
| k | 66 | 34 parts |
| l | 68 | 32 parts |
| m | 70 | 30 parts |
| n | 72 | 28 parts |
| o | 75 | 25 parts |
| p | 78 | 22 parts |
| q | 80 | 20 parts |
| r | 82 | 18 parts |

The copolymers of the above compositions were dissolved in nitromethane to give solutions of approximately 5 to 6% polymer in the nitrohydrocarbon. Films were cast from these solutions and the solvent allowed to evaporate, first at room temperature and then in an oven at 80° C. The average thickness of the films varied from 0.001 to 0.003 inch with tensile strengths varying from 5,100 to 13,000 pounds per square inch depending upon the amount of acrylonitrile in the copolymer. The films containing the higher acrylonitrile had the higher tensile strengths.

Due to the high amount of acrylonitrile, these films are stiff and rigid and not readily subjected to flexing. When cold drawn at room temperature to a 200 or 300% elongation, a sheet material exhibiting orientation along the main axis and possessing increased strength and flexibility was obtained.

The increase in tensile strength of these sheets was remarkable, ranging in order from 11,000 to 28,000 when cold drawn at room temperature. When drawn at higher temperatures, it is possible to achieve a cold drawing of the order of 300 to 500% and to obtain tensile strengths, in compositions containing at least 70% acrylonitrile, of the order of 15,000 to 50,000 pounds per square inch. The yields of the copolymers prepared above were quantitative.

As is well known, polymers of the vinyl ethers have high elastic properties and such polymers when modified with other monomers such as styrene and the acrylate and methacrylate esters have been proposed as elastomers and substitutes for synthetic rubbers. This property of elasticity appears to be retained in compositions wherein the vinyl ether is in the dominating proportion, as for example, when a copolymer of 50 to 60 parts of a vinyl ether and 40 to 50 parts of acrylonitrile is used. This elasticity is so pronounced that, when such compositions are cold drawn, they relax even at room temperature to the undrawn condition and do not exhibit orientation of the molecules parallel to the major axis.

The copolymers of the acrylonitrile with vinyl ethers having substantially more than 50% acrylonitrile, that is, of the order of 55%, may be cold drawn and maintained in a cold drawn condition at room temperature or at higher temperatures when the amount of acrylonitrile is increased.

*Example 2*

The fundamental copolymers of this invention containing from 55 to 85% acrylonitrile and vinyl ether may be modified with other monomers capable of polymerizing with either the acrylonitrile or with the vinyl ether. These monomers may be compounds containing a single ethylenic unsaturation. For example, the acrylic esters, the methacrylic esters, methacrylonitrile, styrene, isopropenyl toluene, the maleic esters, the itaconic esters, etc.

As an example of how these compositions may be modified, there may be given the following ratios of monomers in which there was dissolved 0.25% benzoyl peroxide and placed in sunlight for several hours and then in an oven at 50° C. until the polymerization was completed.

|   | Acrylonitrile | Ethyl acrylate | Vinyl Ether |
|---|---|---|---|
|   |   |   | the isobutyl ether |
| a | 65 | 10 | 25 |
| b | 65 | 5 | 30 |
| c | 65 | 15 | 20 |
| d | 65 | 20 | 15 |
| e | 65 | 25 | 10 |
| f | 65 | 30 | 5 |
|   |   |   | the n-butyl ether |
| g | 65 | 10 | 25 |
| h | 65 | 5 | 30 |
| i | 65 | 15 | 20 |
| j | 65 | 20 | 15 |
| k | 65 | 25 | 10 |
| l | 65 | 30 | 5 |

These copolymers were all hard, tough resins which were soluble in nitromethane. Films were cast from the nitromethane solution and tested before and after drawing at room temperature, the values ranging from 5,000 to 10,000 pounds undrawn and 15,000 to 35,000 pounds in a drawn condition.

Example 3

The following example indicates how the polymer may be prepared in granular form:

| | Parts by weight |
|---|---|
| Acrylonitrile | 70 |
| Vinyl isobutyl ether | 30 |
| Benzoyl peroxide | 1 |
| Polyvinyl alcohol | 2 |
| Distilled water | 400 |

The polyvinyl alcohol is dissolved in the water prior to the addition of the remaining ingredients. The mixture is then heated under agitation at 50° C. until the polymerization is completed. The granular material is then filtered off, washed with distilled water, and dried in a vacuum oven at 50° C. for 24 hours. The polymer is soluble in nitromethane from which it is possible to produce sheets and fibers, etc. of high tensile strength by cold drawing the copolymeric composition.

Example 4

The same procedure and process as in the previous example were used. 75 parts of acrylonitrile and 25 parts of vinyl ether were taken. The copolymer was likewise soluble in nitromethane giving approximately a 12% solution. When the above solution was concentrated to about 15% of the polymer in the nitrohydrocarbon, a mass was obtained which was a gel at room temperature. This gel was further concentrated to 18% solids and when freed of bubbles and solid impurities, it could be extruded through an orifice to form a fiber and when dried by evaporation of the nitromethane solvent the fiber was harsh, stiff and brittle. When cold drawn, the fiber exhibited crystalline orientation along the major axis and possessed considerable strength and excellent flexibility. The filaments produced by this cold drawing process could be drawn into tight knots without breaking.

Example 5

The following example indicates the complete process for the preparation of filaments and fibers of the copolymers of this invention. 100 parts of the copolymer of acrylonitrile (70%) and vinyl ether (30%) are introduced into a steam-heated jacketed dough mixer together with 300 parts of nitromethane and processed at 75 to 100° C. to produce a highly viscous plastic mass, the characteristics of which are such that when allowed to cool to room temperature, a rigid rubbery gel is obtained. This material cannot be filtered at room temperature. The highly viscous plastic mass is passed through candle filters at 70 to 95° C. and under pressure to remove contamination, undissolved particles, etc.

The filtered mass is degassed under a vacuum of 2 to 10 inches at 70 to 90° C. The degassed plastic mass is ready for spinning and is forced by constant pressure pumps through spinnerets. The complete system, that is the reservoir, spinning pumps, nozzles, etc., and the spinnerets, are maintained at a temperature sufficient to keep the mass in a plastic viscous condition. The temperature of the spinnerets is approximately 70 to 90° C. As the plastic mass leaves the spinneret, the filament is immediately converted to a rigid gel by passing through an area whose temperature is lower than the spinneret temperature.

The filament is then dried at a temperature lower than that which would cause the gel to revert to a flowable plastic mass. When sufficient solvent has been removed from the filament, it may be dried at a substantially higher temperature and cold drawn before and after it is collected on bobbins. Any residual solvent may be further removed by heating after the material has been cooled on the bobbin.

Example 6

| | Parts by weight |
|---|---|
| Acrylonitrile | X (55 to 85%) |
| Vinyl ether | Y (45 to 5%) |
| Ethyl methacrylate | 100—(X+Y) |

The above ingredients are polymerized in the usual manner. Extrusion or spinning of the fiber-forming material and subsequent cold drawing results in a molecularly oriented fiber possessing good strength, flexibility, and high solvent resistance. A special composition which may be used to yield excellent results is

| | Parts by weight |
|---|---|
| Acrylonitrile | 70 |
| Vinyl butyl ether | 25 |
| Ethyl methacrylate | 5 |

Example 7

| | Parts by weight |
|---|---|
| Acrylonitrile | X (55 to 85%) |
| Vinyl ether | Y (45 to 5%) |
| A third component | 100—(X+Y) |

As in the previous example, the mixture of monomers was polymerized in the usual manner and then extruded or precipitated in a form which may be cold drawn. Molecular orientation parallel to the major surface is accomplished by cold drawing.

Specific examples of third components which may be used to modify the acrylonitrile-ether compositions are methyl acrylate, ethyl acrylate, propyl acrylate, methyl methacrylate, propyl methacrylate, benzyl methacrylate, dimethyl maleate, diethyl maleate, dipropyl maleate, diethyl itaconate, styrene, etc. As noted from these examples, I have also discovered that certain monomers having a single ethylenic unsaturation such as styrene, diethyl maleate, etc., which do not form copolymers with acrylonitrile, which are satisfactory for cold drawing, will form satisfactory copolymers when copolymerized with the acrylonitrile in the presence of the vinyl ether according to the ratio expressed by the formula in Example 7.

In the practice of this invention, the nitrohydrocarbons were found to be the most suitable materials either when used as true solvents or gelation solvents. Since these solvents or gelation agents are used in intermediate stages in the execution of this invention, it is desirable that such solvents have low boiling points so that they may be removed readily from the copolymer mass. Among suitable nitrohydrocarbon materials may be mentioned, nitro-aliphatics, such as nitromethane, nitroethane, nitropropane, nitrobutane, the nitro-aromatics and the nitro-cycloaliphatics. Also, there may be used in connection with them, but preferably in minor proportions, certain ketones, for instance, acetone, methyl ethyl ketone, methyl propyl ketone, methyl amyl ketone, acetophenone, phorone, methyl chlorphenyl ketone, methyl nitrophenyl ketone, chlorethyl nitrophenyl ketone, diacetone alcohol, acetonyl acetone, acetyl acetone, biacetyl, methyl acetoacetic ester, ethyl acetoacetic ester, etc.; the nitro-alcohols such as, 2-nitro-1-ethanol, 2-nitro-1-propanol, 2-nitro-1-butanol, 2-nitro-1-pentanol, etc.; esters of the aforementioned nitro-alcohols, such as, the formate, the acetate, the propionate, the butyrate, etc.; the ethers of the aforementioned nitro-alcohols, for example, the methyl, the ethyl, the propyl, and the butyl ethers, etc.; the cyano-alcohols, for example, lactonitrile, the addition products of the lower-boiling aldehydes and ketones with hydrogen cyanide, for example, the reaction products of hydrogen cyanide with acetaldehyde, propionaldehyde, acetone, methyl ethyl ketone, etc.; the esters of the cyano-alcohols, for example, the formate, the acetate, the propionate, etc.; the ethers of the cyano-alcohols, for example, the methyl, ethyl, propyl, etc. ethers. Certain phosphates such as trimethyl and triethyl phosphates may likewise be used.

The foregoing gelation agents are mentioned by way of illustration and not as limitations, except where limitations are found in the claims appended hereto, since I believe myself to be the first to discover the possibility of making a gel from the materials in question and the process of utilizing the gel.

Since it is extremely difficult to incorporate plasticizers into the copolymers of this invention by the ordinary milling process, I prefer to accomplish this by adding the plasticizer either to a solution of, or to a gel of the copolymer in the solvents mentioned heretofore.

By this method, many plasticizers which normally do not possess good compatibility with the polymer may be incorporated into the polymer. Suitable high-boiling plasticizers may be mentioned, the polybasic esters of cyanoethyl alcohol, such as, the esters of phthalic, succinic, sebacic, tetrahydrophthalic, endomethylene tetrahydrophthalic, acetyl citric acids, etc. It is not necessary that all of the carboxyl groups of the polybasic acid be esterified with the cyano-alcohol. Thus, in a dicarboxylic acid, one carboxyl group may be esterified with the cyano-alcohol, and the other with the methyl, ethyl, propyl, butyl alcohols, etc.; and in a tricarboxylic acid, it is sufficient if one or two of the carboxyl groups are esterified with the cyano-alcohol, and the residual carboxyl groups esterified with another alcohol. Also, as suitable plasticizers for the products of this invention may be mentioned the condensation products of acrylonitrile with organic compounds containing active hydrogen such as, for example, the condensation product of an acrylonitrile and acetone wherein the hydrogens of the —CH$_3$ groups of the acetone may be substituted by from one to six β-cyanoethyl groupings. Other plasticizers which may be prepared by the condensation of acrylonitrile with organic compounds containing active hydrogen are the condensation products with alcohols, for example, with phenyl ethyl alcohol, phenoxyethyl alcohol, methoxy diethylene glycol, ethoxy diethylene glycol, phenoxy diethylene glycol, etc., condensation products of acrylonitrile with such compounds as the acetoacetic esters, malonic esters, acetyl acetone, and certain polycyclic hydrocarbons containing active CH$_2$= groupings, the condensation products of acrylonitrile with cyano- and nitro-alcohols, etc.

The fibers and smaller articles produced according to this invention may be woven into highly insoluble and chemical resistant cloth for use in filter cloths and handling chemicals and the like. They may also be used for textiles, for example, cloth, hosiery, articles of clothing, etc. In the form of sheets, they may be used as protective coatings, awnings, raincoats, shower curtains, aprons, hospital bed sheeting, containers for hydrocarbon oils, gasoline, kerosene, Vasoline, ointments, etc.

I claim:

1. A molecularly oriented article which exhibits characteristic crystalline X-ray diffraction patterns comprising the cold drawn polymerization product of a mixture comprising 55 percent but not more than 85% of acrylonitrile and 15 to 45 percent of a vinyl ether having the structural formula CH$_2$=CHOR where R is a radical selected from the group consisting of alkyl, aralkyl and aryl radicals.

2. A molecularly oriented fiber which exhibits characteristic crystalline X-ray diffraction patterns which comprise a cold-drawn fiber of a polymerization product of a mixture comprising 55 percent but not more than 85% of acrylonitrile and 15 to 45 per cent of a vinyl ether of the formula CH$_2$=CHOR where R is a radical selected from the group consisting of alkyl, aralkyl and aryl radicals.

3. A molecularly oriented article which exhibits characteristic crystalline X-ray diffraction patterns comprising the cold drawn polymerization product of a mixture comprising 55 percent but not more than 85% of acrylonitrile and 15 to 45 per cent of a vinyl alkyl ether.

4. A molecularly oriented article which exhibits characteristic crystalline X-ray diffraction patterns comprising the cold drawn polymerization product of a mixture comprising 60 percent but not more than 82% of acrylonitrile and 18 to 40 per cent of a vinyl butyl ether.

5. A molecularly oriented article which exhibits characteristic crystalline X-ray diffraction patterns comprising the cold drawn polymerization product of a mixture comprising 60 percent but not more than 82% of acrylonitrile and 18 to 40 per cent of n-butyl vinyl ether.

6. A molecularly oriented article which exhibits characteristic crystalline X-ray diffraction patterns comprising the cold drawn polymerization product of a mixture comprising 60 percent but not more than 78% of acrylonitrile and 22 to 40 per cent of iso-butyl vinyl ether.

7. A molecularly oriented article which exhibits characteristic crystalline X-ray diffraction patterns comprising the cold drawn polymerization product of a mixture comprising 55 percent but not more than 85% of acrylonitrile and 15 to 45 per cent of a vinyl ether of formula CH$_2$=CHOR where R is a radical selected from the group consisting of alkyl, aralkyl, aryl radicals, said article being plasticized with a cyano-alcohol ester of a polycarboxylic acid.

8. A molecularly oriented article exhibiting characteristic crystalline X-ray diffraction patterns of a composition comprising the copolymerization product of a mixture comprising 55 percent but not more than 85% of acrylonitrile and 15 to 45 per cent of a monovinyl ether of the formula CH$_2$=CHOR where R is a radical selected from the group consisting of alkyl, aralkyl and aryl radicals, and a polymerizable monoethylenic unsaturated monomer.

9. A molecularly oriented article exhibiting characteristic crystalline X-ray diffraction patterns of a composition comprising the copolymerization product of a mixture comprising 55 percent but not more than 85% of acrylonitrile and 15 to 45 per cent of a monovinyl ether of the formula $CH_2=CHOR$ where R is a radical selected from the group consisting of alkyl, aralkyl and aryl radicals, and an ester of acrylic acid and a monohydric alcohol.

10. A molecularly oriented fiber showing a characteristic crystalline X-ray diffraction pattern which comprises a cold drawn polymerization product of a mixture comprising at least 55 percent but not more than 85 percent of acrylonitrile, 5 to 30 per cent of a vinyl butyl ether and 5 to 30 per cent of ethyl acrylate.

11. A molecularly oriented fiber showing a characteristic crystalline X-ray diffraction pattern which comprises a cold drawn copolymerization product of a mixture comprising 70% acrylonitrile, 25% of a vinyl butyl ether, and 5% ethyl acrylate.

12. A molecularly oriented fiber showing a characteristic crystalline X-ray diffraction pattern which comprises a cold drawn copolymerization product of a mixture comprising 65 to 75% acrylonitrile and 25 to 35% of a vinyl butyl ether.

13. A cohesive workable reversible gel adapted to the preparation of shaped or molecularly oriented structures which is essentially a nitroalkyl liquid hydrocarbon containing 1 to 4 carbon atoms in the alkyl group and the polymerization product of a mixture comprising 55% but not more than 85% of acrylonitrile and 45 to 15% of a monovinyl ether of the formula $CH_2=CHOR$ where R is a radical selected from the group consisting of alkyl, aralkyl and aryl radicals, said polymerization product being the minor component of the gel.

14. A cohesive workable reversible gel adapted to the preparation of shaped or molecularly oriented structures which is essentially nitromethane and the polymerization product of a mixture comprising 55% but not more than 85% of acrylonitrile and 45 to 15% of a monovinyl ether of the formula $CH_2=CHOR$ where R is a radical selected from the group consisting of alkyl, aralkyl and aryl radicals, said polymerization product being the minor component of the gel.

GAETANO F. D'ALELIO.

REFERENCES CITED

The following references are of record in the file of this patent:

UNITED STATES PATENTS

| Number | Name | Date |
|---|---|---|
| 1,929,453 | Semon | Oct. 10, 1933 |
| 2,161,766 | Rugeley et al. | June 6, 1939 |
| 2,190,265 | Hubert et al. | Feb. 13, 1940 |
| 2,016,490 | Fikentscher | Oct. 8, 1935 |

FOREIGN PATENTS

| Number | Country | Date |
|---|---|---|
| 634,408 | Germany | Aug. 26, 1936 |

OTHER REFERENCES

Bogin, Paint, Oil and Chemical Review, Oct. 8, 1942, pp. 8–10, 25–29.